United States Patent
Corl, Jr. et al.

(10) Patent No.: US 6,772,223 B1
(45) Date of Patent: Aug. 3, 2004

(54) CONFIGURABLE CLASSIFICATION INTERFACE FOR NETWORKING DEVICES SUPPORTING MULTIPLE ACTION PACKET HANDLING RULES

(75) Inventors: Everett Arthur Corl, Jr., Raleigh, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,486

(22) Filed: Apr. 10, 2000

(51) Int. Cl.⁷ .............................................. G06F 15/173
(52) U.S. Cl. ................... 709/238; 709/220; 709/223; 709/224; 714/13; 713/1
(58) Field of Search ............................... 709/220, 223, 709/224, 238; 714/13

(56) References Cited

U.S. PATENT DOCUMENTS

| | | | |
|---|---|---|---|
| 4,980,886 A | * 12/1990 | Bernstein | 370/80 |
| 5,606,668 A | * 2/1997 | Shwed | 395/200 |
| 5,812,871 A | * 9/1998 | Lundberg et al. | 395/800 |
| 5,835,087 A | * 11/1998 | Herz et al. | 345/810 |
| 6,014,427 A | * 1/2000 | Hanson et al. | 379/67.1 |
| 6,108,578 A | * 8/2000 | Bardy et al. | 607/5 |
| 6,151,623 A | * 11/2000 | Harrison et al. | 709/206 |
| 6,335,935 B2 | * 1/2002 | Kadambi et al. | 370/396 |
| 6,453,358 B1 | * 9/2002 | Michels | 709/238 |
| 6,467,049 B1 | * 10/2002 | Robins et al. | 714/13 |

* cited by examiner

Primary Examiner—Hosain Alam
Assistant Examiner—Liang-Che Wang
(74) Attorney, Agent, or Firm—Scully Scott Murphy & Presser

(57) ABSTRACT

A method and apparatus for defining the types of actions that are to be applied to packets processed by a network processor device such as an IP router, switch, and the like. The apparatus includes an interface for configuring a packet classifier device in the network processor by enabling user specification of packet classification rules, each rule having one or more action types, and further, by enabling definition of one or more associated set of action attributes (characteristics) that may be associated with individual action types.

16 Claims, 4 Drawing Sheets

Network Processor

Rules 1 and 2
Intersect

Rules 1 and 2
Identical

Rule 1
INCLUDE
Rule 2

CONFIGURABLE CLASSIFICATION INTERFACE FOR NETWORKING DEVICES SUPPORTING MULTIPLE ACTION PACKET HANDLING RULES

BACKGROUND OF THE INVENTION

1. Field of the Invention

This invention relates generally to network processor devices, and more specifically, to a mechanism employed in network processor devices for supporting complex packet handling rules.

2. Discussion of the Prior Art

A simple definition of the tasks performed by a "networking" device (such as, but not limited to, an IP router, switch or firewall) is as follows: 1) accepting packets as input; and, 2) based on information in the packet or on the packet's origin, deciding what to do with the packet. As defined herein, the assessment made on packets is termed "Packet Classification" and, the unit of software and hardware that classifies packets and applies result of the classification to the packet is a "Classifier". FIG. 1 is a general block diagram depicting a network processor device 100 including a Classifier device 105. Generally, as shown in FIG. 1, a plurality of rules 110 are entered into a Classifier rule list (or tree) 125 by a user program 115, and a packet handler device 130 interrogates this list 125 when processing a packet to find rules appropriate for the packet.

Each rule in the Classifier rule list 125 includes instructions on how to identify matching packets, and information on how to process the packet, i.e., what actions to take. To identify packets, certain bits (or fields) in a packet and information related to the packet's origin or destination are used. These fields are extracted from a packet and combined to form a "key" 131 which may be used to search the classifier rule list 125. The key fields, obviously, also define the comparison information (herein referred to as "rule description") found in the Classifier rules. As mentioned, rule descriptions may include multiple fields. An example is the classic IP 5-tuple which includes IP source Address (SA), IP Destination Address (DA), Source Port (SP), Destination Port, and IP protocol. It is understood that other fields may also be included. Additionally, the individual fields may be expressed as exact values (DA=1.25.77.1), value and mask (1.25.77.*;255.255.255*), or ranges (1.25.77.1<DA<1.25.77.9).

As depicted in FIGS. 2(a)–2(c), rule descriptions in any two rules may intersect with each other. For example, as shown in FIG. 2(a), a rule description for Rule 1 intersects a rule description for Rule 2, whereas in FIG. 2(b) both Rules 1 and 2 are identical. In FIG. 2(c), Rule 1 includes a whole Rule 2.

Instructions, found in the Classifier rule, define how to process a matching packet. The instructions are expressed in terms of an action "type" and parameters (data) corresponding to that type. The instructions might have filtering, quality of services (QoS), redirection, or other attributes (characteristics). Values for filtering may include "permit" or "deny". Values of QOS might include on which queue to place the packet, or how to re-mark the packet. Redirection instructions may include where a particular packet should be sent.

It would be highly desirable to provide a mechanism for defining the types of actions that must be applied to packets processed by a networking device and which define the set of action attributes (characteristics) that may be associated with individual packet classification rules.

SUMMARY OF THE INVENTION

It is an object of the invention to provide a mechanism for defining the types of actions that must be applied to packets processed by a networking device and which define the set of action attributes (characteristics) that can be associated with individual packet classification rules.

According to a preferred embodiment of the invention, there is provided a configurable packet classifier implemented in a network processor device for processing data packets communicated in a network, the classifier comprising: an attribute type definition table having entries including action types and corresponding action attributes; a classifier rule list structure comprising one or more data packet action rules, each classifier rule comprised of one or more action types having one or more corresponding action attribute values; a packet handling device responsive to an arrived data packet for searching the classifier rule list structure and identifying a matching action type and corresponding one or more attribute values that match the arrived data packet; and, a device for determining if an entry in the attribute type definition table has a corresponding action attribute and applying said corresponding one or more attribute values to the data packet.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 3:
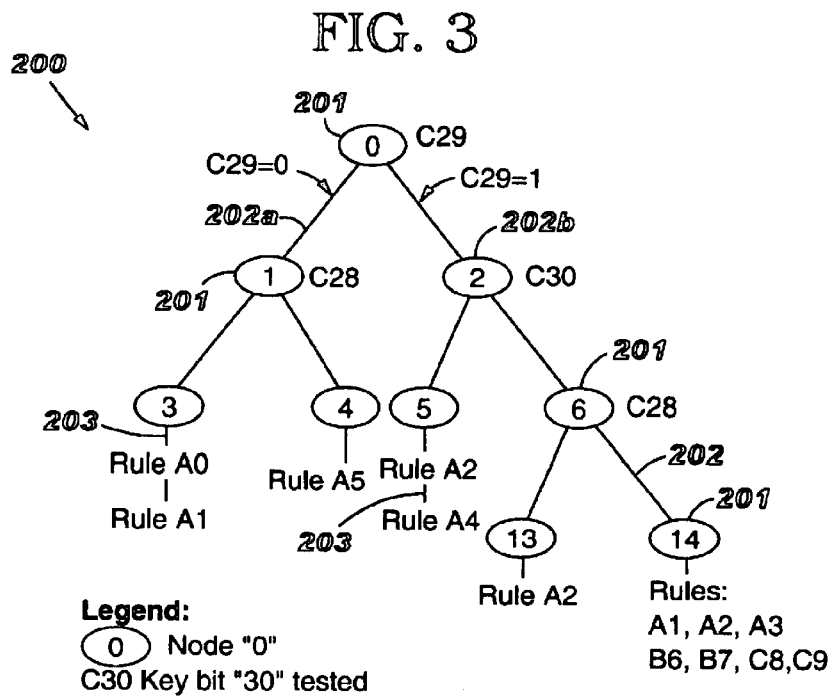
FIG. 3 illustrates a choice bit algorithm tree construction for a binary tree according to one embodiment of the invention.

FIG. 3 illustrates a choice bit algorithm tree configuration 200 for a binary tree as implemented in the classifier rule list according to one embodiment of the invention. In the choice bit algorithm tree configuration 200 of FIG. 3, there are provided nodes 201, with nodes having either branches 202 connected to other nodes, or leafs 203 comprising Classifier rules. In the choice bit binary tree construction of FIG. 3, it is clear that rules are labeled A0, A1, A2, . . . An, with the number identifying the rule number (i.e., 10 rules numbered 0–9), and the rule's action type identified by the letter A (i.e., types A, B. C). When the packet handling software searches the example Rule classifier of FIG. 3 it operates as follows: at each node 201, a key field test is performed, e.g., a bit comparison for the key of the arrived packet, for deciding along which tree path and ultimately, which rule(s) is (are) to be applied to the particular packet. For instance, as shown in FIG. 3, at node indicated as node zero (0), a test of key bit C29 is performed, and depending upon its value, will either traverse along branch 202a or 202b depending upon the bit value. If the value of key bit C29 is such that the tree is traversed along path 202a to node 1, then a further test of key bit C28 is performed. Alternately, if the value of key bit C29 is such that the tree is traversed along path 202b to node 2, then a further test of key bit C30 is performed. Ultimately, when traversing along branch 202a, the packet will either be processed according to the action specified by Rules A0, A1 (at node 3) or Rule A5 (at node 4). Alternately, when traversing along branch 202b, the packet will either be processed according to the action specified by Rules A2 or A4 (at node 5), Rule A2 (at node 13), or Rules A1, A2, A3, B6, B7, C8 or C9 (at node 14). It is understood that more than one rule may exist for the same action type, and additionally rules of different action types may appear in the same node (e.g., at node 14). Furthermore, any rule appearing in the same node may match a key derived from any given packet. As mentioned earlier, information in the rule is compared with the key to determine if the rule, in fact, does match the key.

Figure 4:
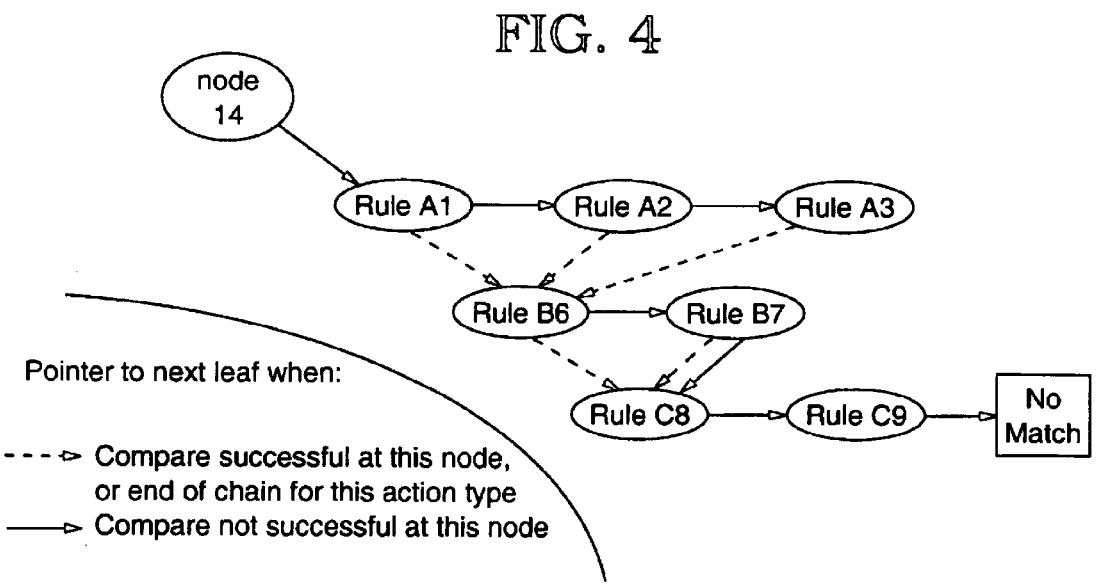
FIG. 4 illustrates a detailed rule application process for multiple actions as provided at node 14 of FIG. 3.

FIG. 4 illustrates a detailed rule application process for multiple actions as provided at node 14 of FIG. 3. The multiple action support procedure for a classifier rule will be described in greater detail herein.

In accordance with the present invention, action information is defined in a Classifier rule (i.e., leaf in a tree) and includes action information Types, Attributes, and Values that are user configurable. Action information types ("Action Types") are defined by the user prior to adding rules. To define an action Type, the user specifies one or more Action information Attributes ("Action Attributes") that comprise the Type. These Action Attributes are chosen from a fixed set defined by the Classifier. Examples of Action information Attributes include, but are not limited to: 1) Filtering (e.g., does the user want to allow the packet to be forwarded, or discarded); 2) QOS (e.g., on which transmit queue should the packet be placed, and should the packet be marked with a certain priority value); and, 3) Redirection (i.e., where should the packet be sent). It is understood that the flexible nature of Action Type definitions is facilitated by use of the Action Attributes. Action information Types are additionally defined by the user and once defined, they may be used in the action information specification for a Classifier rule. Types may be defined from one or more action Attributes and an attribute may be used in the definition of more than one type. Thus, for example, a filtering attribute may be used to define more than one action type, perhaps an "ingress filter type" and an "egress filter type".

Figure 1:
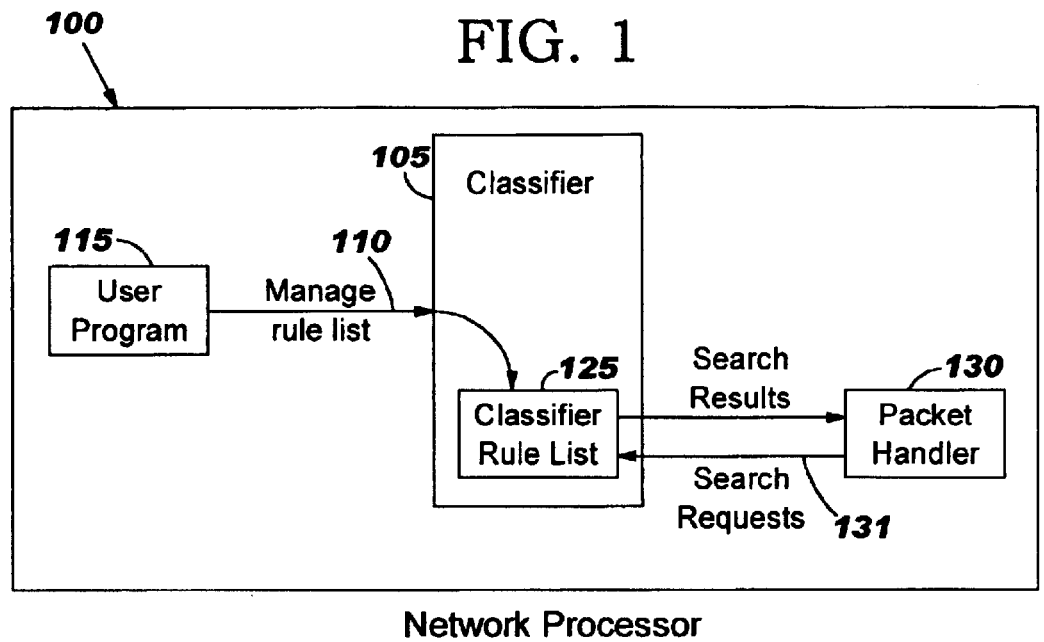
FIG. 1 illustrates a block diagram of a network processor implementing the configurable packet classification interface according to the invention.
Figure 2A:
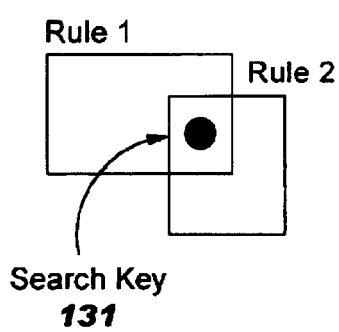
FIGS. 2(a)–2(c) illustrate different embodiments of search rule intersection when implementing search keys.
Figure 2B:
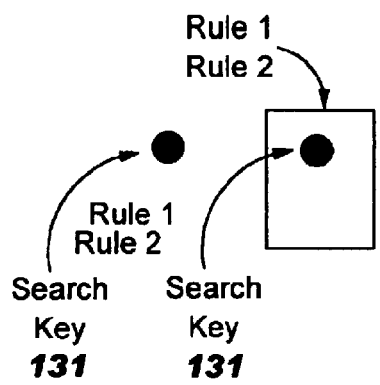
Figure 2C:
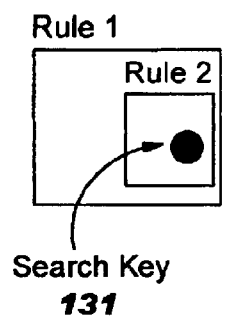

As a first example to illustrate how these features may be used, for the case of a Single Attribute Action Type and Multiple Attribute Action Type, it is first assumed that two independent applications using the Classifier are employed: one application defining filtering rules and the other application defining QOS rules. Each application has it own user interface for constructing rules, however, the two user interfaces are not designed to communicate with each other. However, it may be necessary that both filtering and QOS actions to be applied to each packet. Therefor, if for a given packet there is a rule that defines filtering information (e.g., permit) and a rule that defines QOS information (e.g., place on "queue 2"), it is necessary to find both rules in the Classifier rule list and apply this information to the packet. This is accomplished by enabling the user program (FIG. 1) to define an Action Type using the filtering attribute and a second Action Type using the QOS attribute. The filtering application creates rules with this first Action Type and the QOS application creates rules with the second Action Type. In operation, when the packet handling software searches the Classifier tree, it knows that there are (potentially) two rules (one rule for each Action Type) that might be found which match this packet. When it begins the tree search, it finds the filtering action. Since it has been configured to know that there may also be a QOS action, it resumes the tree search to find the QOS rule. Both rules are applied (in sequence) to the packet. It should be noted further that, in this case, two searches are made of the rule list. Of course, multiple searches likely means more system resources are used. The need for additional searching however, is balanced with other factors such as programming convenience. Thus, in this example, separate applications benefit by from being able to install separate rules.

A further example is now provided illustrating how these features may be used, for the case of defining Multiple attributes for a single Action type. In this example, it is assumed that these same filtering and QOS applications share a common user interface, or, in some way, the interfaces are designed to communicate with each other to resolve rule intersections. They operate in conjunction to create a single action type that has both the filtering attribute and the QOS attribute. When they desire to add rules, they are able to detect intersections in the descriptions and make sure that information from filtering application users and QOS application users are combined together into one rule. It should be noted further that, in this case, only one search needs to be made of the tree for each packet as both filtering and QOS information are included in the same rule. The additional software required to reconcile rule intersections yields the run-time benefit of reduced cycle time spent on search the rule list.

A further example is now provided illustrating how these features may be used when the Same attribute is used to define more than one Action Type. As with the "multiple action type" example, it is assumed that there exists two applications that define rules for the Classifier. However, it is supposed that both of these applications are responsible for "filter" rules with a first Filter Application 1, for instance, defining rules for assuming that if a rule is not specified for certain frames then that frame will be forwarded and, a Filter Application 2, for instance, defining a default discarding of the frame. As these two Filter Applications do not reconcile input from their respective user interfaces to create a single rule set for filtering, they are permitted to define separate filtering action types. In this case, however, it happens that both applications need to define rules with the same filtering attribute. If the user wants to create filter rules based on ingress and egress ports, for example, the ingress port is ignored in egress rules, and vice versa, the egress port is ignored for ingress rules. One filtering action type could be defined for "ingress" filters, and one could be defined for "egress" filters. So, an ingress filter application could add rules of one type, and the egress filter applications could add rules of the other type. The two applications need not reconcile rule intersections.

According to the invention, action information data (value(s)) may additionally be specified with each rule and are based on the rule's specified action information type.

Parameters for all attributes associated with the action type are stored together in the rule (leaf) to form the action information data. Thus, when an Action Type is defined, the user program associates a set of action attributes with the defined type. A rule's action information data specifies parameter values for all of the action attributes associated with the rule's action information type.

One example of action data includes a filtering attribute that intuitively has an associated boolean parameter whose value might be either permit or deny (i.e., transmit or discard). Assuming that an action information type is defined which includes the filtering attribute, then any rule which specifies this action type also specifies action data which includes a value for the filtering attribute parameter, i.e., a value of "permit" or "deny". Another example of action data includes a QOS attribute that intuitively has an associated parameter that specifies the priority to give to matching frames. Assuming that an action type is defined to include two attributes: the filtering and QOS attributes. Then, any rule which specifies this action type also specifies action data which includes a value for the filtering attribute parameter ("permit" or "deny"), and also a value for the QOS attribute (priority).

Figure 5:
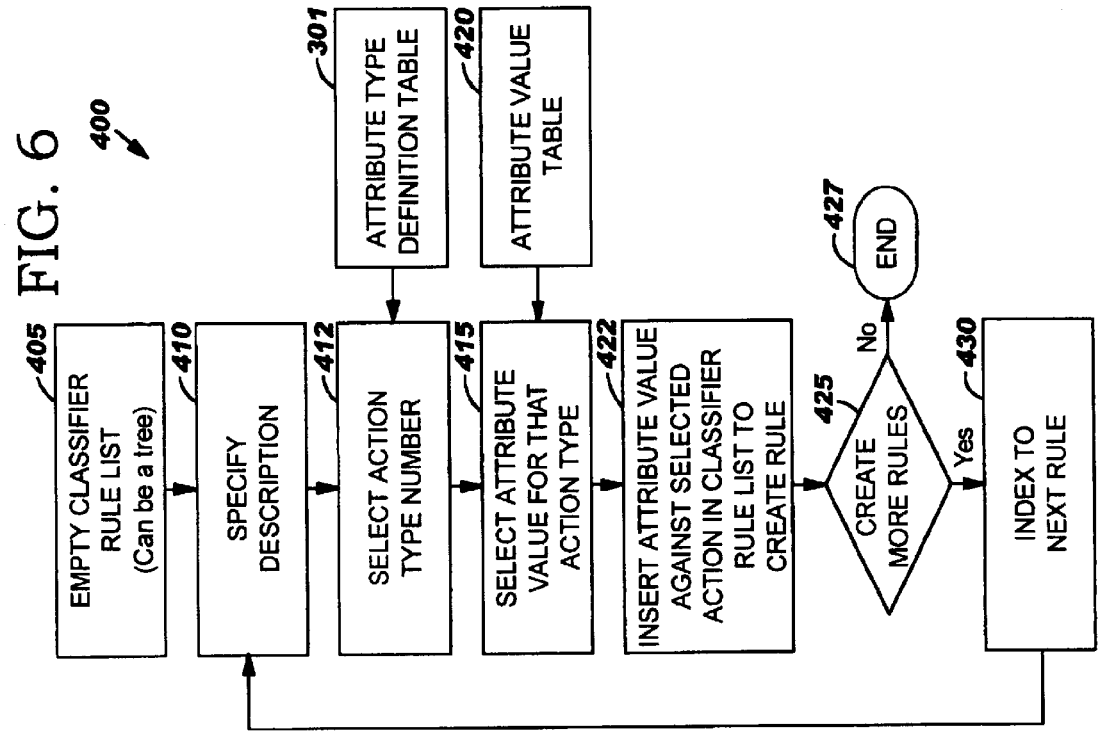
FIG. 5 is a flow chart illustrating the Action Type Definition Procedure for defining action types for a rule Classifier list structure according to the principles of the invention.
Figure 6:
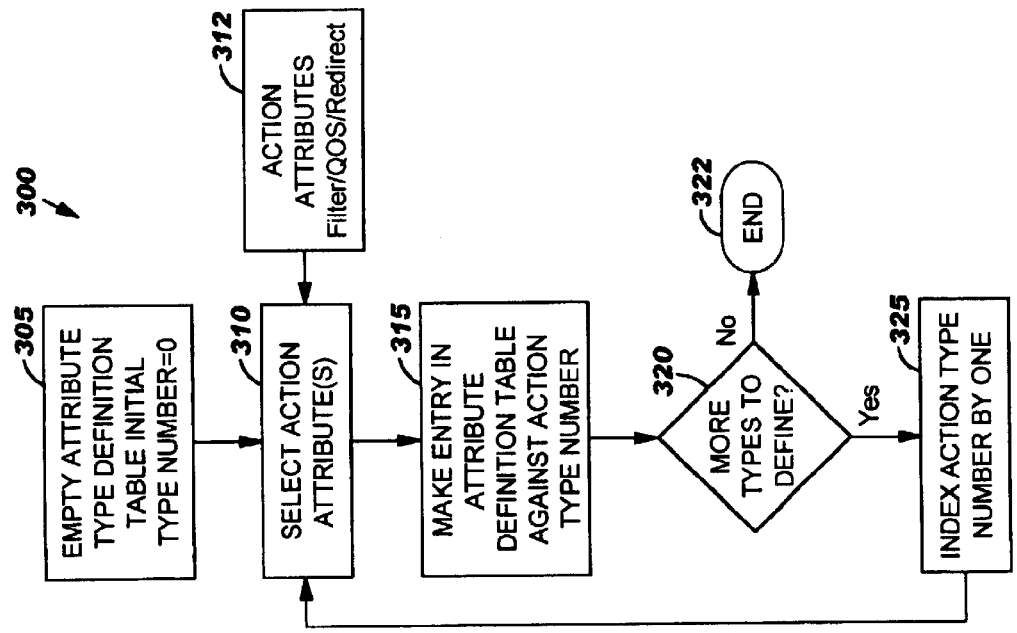
FIG. 6 is a flow chart illustrating the Rule Definition Procedure for defining Rules for a rule Classifier list structure according to the principles of the invention.

FIGS. 5 and 6 are flowcharts illustrating, respectively, the Action Type Definition Procedure and the Rule Definition Procedure according to the principles of the invention.

In the Action Type definition process 300 of FIG. 6, there is depicted a first step 305 of creating an empty Attribute Type Definition Table, and initializing a first Action Type by assigning it a number zero (0), for example. Then, at step 310, for this first Action Type, the Action Attributes (e.g., filter, QOS, Redirect) to be associated with this Action Type are selected by the user from a list 312 of available Action Attributes. The selected Action Attribute(s) for the selected attribute Type are and then entered into the Attribute Type Definition Table in the next step 315. In the implementation of the present invention, this is done by having bit positions in a representative data structure representing all Action Attributes entered against the Action Type, and then turning on the bits corresponding to the Action Attributes selected. Next, at step 320, a decision is made as to whether additional Action Types are to be defined. If no additional Action Types are to be defined, the Attribute Type Definition Table process is terminated as indicated at step 322. If it determined that additional Action Types are to be defined, then the Action Type Number is incremented by one (1) at step 325 and the process returns to the select Action Attributes step 310 for Action Attribute selection.

In the Rule Definition process 400 of FIG. 6, there is depicted a first step 405 of creating an empty Classifier Rule List. It is understood that this list may be configured in the form of a table or a tree such as depicted in FIG. 3. At step 410, the user first specifies a description of the first rule. Then, at step 412, the user specifies an Action Type Number and its corresponding Action Attributes from the Attribute Type Definition Table 301 previously created by the user as described herein with respect to steps 305, 315, FIG. 6. Next, at step 415, FIG. 7, the user selects Attribute Values for that Action Type from a list of available Action Values 420 (see Table 1).

Then, at step 422, the selected Attribute Value(s) is (are) inserted against the selected Action type in the Classifier Rule List 405 to create a rule, i.e., as a table entry or a leaf in a tree. Next, at step 425, a determination is made as to whether additional rules are to be defined. If no additional rules are to be defined, the Classifier Rule Definition process is terminated as indicated at step 427. If additional rules are to be defined, the rule number is indexed by one and the process returns to step 430 for user specification of the next rule description.

In the preferred embodiment of the invention, the network processor packet handler device 130 (FIG. 1) implements run-time frame handling software that utilizes the Action Data, i.e., (Action Type(s), Attribute(s) and Value(s)) specified herein. That is, the packet handling components of the present invention cooperate with other packet handling tasks to determine the entire disposition of each received packet. Thus, aspects of the classifier packet handling task 130 in accordance with the present invention includes: 1) building a KEY from the packet and information related to this packet; 2) conducting a search of the Classifier rules using the KEY; 3) applying action data obtained from matching rules including: a) determining the Action Type associated with the rule and the defined Action Attributes which need to be applied to the packet; and b) applying Action Values associated with the attributes stored in the rule to the packet for all attributes corresponding to the rule's Action Type; and, 4) repeating step 3) until all defined action types have been addressed.

Figure 7:
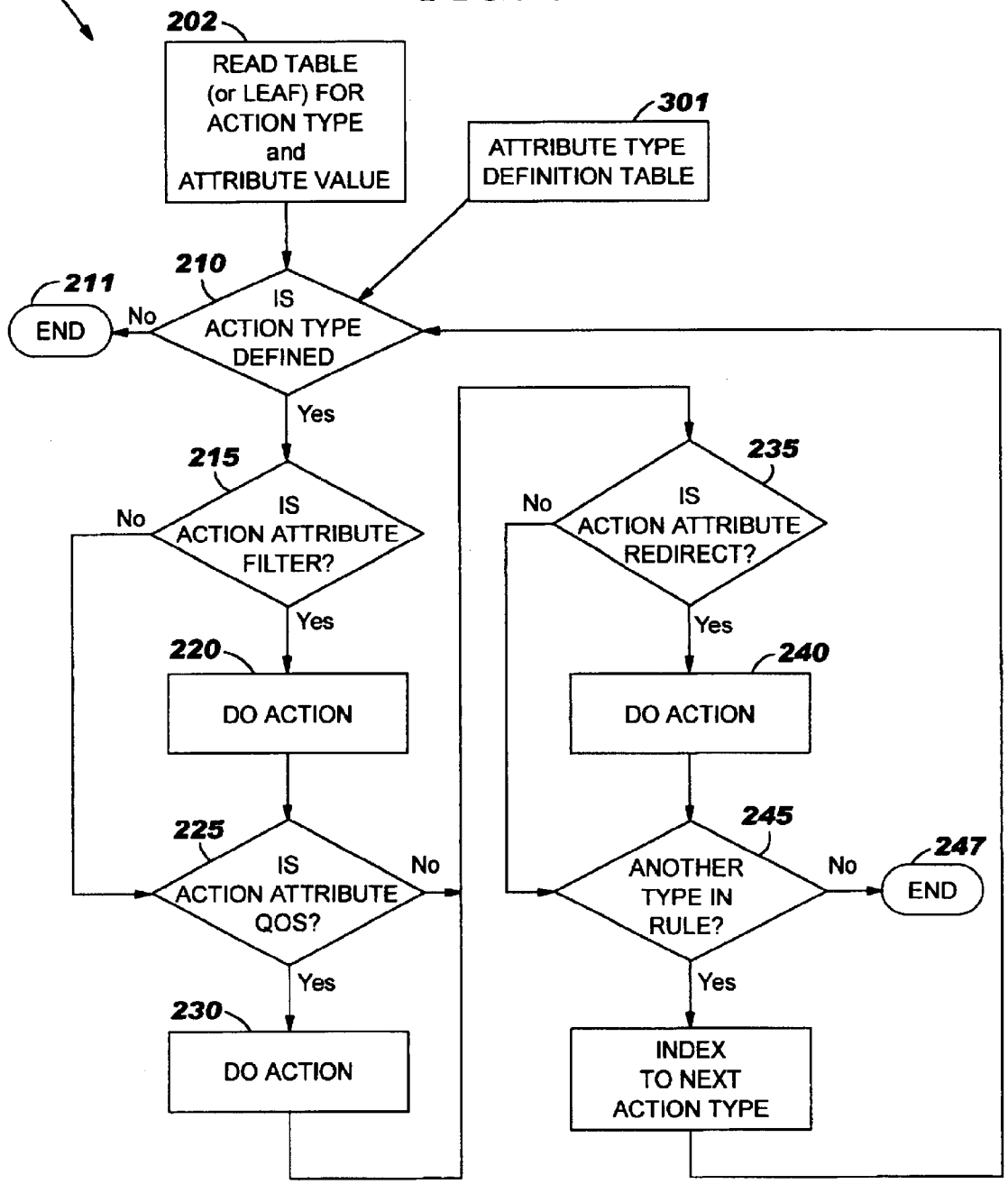
FIG. 7 is a detailed flow chart depicting the run-time packet handling process 200 in accordance with present invention.

Each rule in the Classifier rule list FIG. 7 is a detailed flow chart depicting the run-time frame handling process 200 in accordance with present invention. As depicted in FIG. 7, a first step 202 includes retrieving the Action Type (and Attribute Value) upon matching of a KEY derived from the packet with a classifier rule. Next, at step 210, a determination is made as to whether the Action Type is defined in the Attribute Type Definition Table 301 (FIG. 6). If the Action Type is not defined in the Attribute Type Definition Table 301, then the classification ends. If the Action Type exists in the Attribute Type Definition Table 301, then the Action Attribute is determined and the action for that attribute is applied to the packet. In the example embodiment illustrated in FIG. 7, the action is performed in three steps corresponding to the three Action Attributes used in the examples discussed herein, i.e., Filtering, QOS, and Redirect in that order. However, it is understood that it is within the spirit and scope of the present invention to define additional Action Attributes for a classifier rule and perform additional actions. Thus, returning to FIG. 7, at step 215, a determination is made as to whether the Filtering Attribute bit in the classifier rule is "turned on". If the Filtering Attribute bit is set, then the filtering action is performed at step 220. Continuing from step 220, or, if it was determined that the filtering Attribute was not turned on at step 215, the next Action Attribute (QOS) is checked at step 225. If the QOS bit is set, then the QOS action is performed at step 230. Continuing from step 230, or, if it was determined that the QOS Attribute was not turned on at step 225, the next Action Attribute (Redirect) is checked at step 235. If the Redirect bit is set, then the Redirect action is performed at step 240. Continuing from step 240, or, if it was determined that the Redirect Attribute was not turned on at step 235, a determination is made at step 245 as to whether the another Action Type is defined in the rule. If no other Action Type exists in the rule, then classification ends at step 247. If another Action Type exists, the classifier indexes to the next Action Type at step 250, and the process returns to step 210 to determine whether the next Action Type is defined decision. As described above, when the invention is embodied as a tree, then leafs (rules) are comprised of connected Action Types.

Note that while the configurable classification interface of the present invention describes a process by which the attribute type is stored in the rule and the corresponding attribute list is retrieved from a table, it is within the spirit of the present invention that the attribute list may itself be stored in the rule.

The configurable classification interface of the present invention is preferably implemented in a network processing device and system such as described in commonly-owned, co-pending U.S. patent application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A configurable packet classifier implemented in a network processor device for processing data packets communicated in a network, said classifier comprising:

an attribute type definition table having a plurality of entries defining action types, each defined action type having a corresponding combination of action attributes;

classifier rule list structure comprising one or more data packet action rules, each classifier rule comprised of an identifying description, an action type, and one or more action attribute values for each action attribute corresponding to the action type;

packet handling device responsive to an arrived data packet for searching said classifier rule list structure and identifying one or more matching rules having identifying descriptions that match a key of said arrived data packet, said packet handling device referring to said attribute type definition table to determine whether an action type has been defined for a particular matched rule, and if an action type is not defined, ending said searching, and if an action type is defined, determining a combination of action attributes that apply for the corresponding action type of the matching rule and applying said corresponding attribute values of each matching rule to said data packet, wherein application of multiple attributes reduce cycle time spent on searching said classifier rule list structure.

2. The configurable packer classifier according to claim 1, wherein each said action types is defined by a user of said classifier, said corresponding one or more action attributes being selected from a predetermined list of action attributes to create each said action type in the attribute type definition table.

3. The configurable packet classifier according to claim 1, wherein said attribute values are defined by a user of said classifier and are selected from a predetermined list of action values to create said classifier rule list structure.

4. The configurable packet classifier according to claim 1, wherein said classifier rule list structure comprises a binary tree.

5. The configurable packet classifier according to claim 1, wherein said rule list structure comprises a look-up table.

6. The configurable packet classifier according to claim 2, wherein said attribute type definition table entry defines a digital data structure having bit positions corresponding to user selectable action attributes, each bit position being set for assigning a corresponding attribute to an action type.

7. The configurable packet classifier according to claim 2, wherein said packet handling device comprises:

parsing mechanism for parsing said arrived data packet and extracting packet information; and, build mechanism for building a key associated with the extracted packet information, wherein said key is used for searching said classifier rule list structure.

8. The configurable packet classifier according to claim 2, wherein said predetermined list of action attributes includes one or more selected from a group comprising:

filtering, queuing according to packet quality of service class and redirecting said packet.

9. A method for implementing a packet classifier device including a classifier rule list structure configured for use in a network processor device that processes data packets communicated in a network according to classifier rules, each classifier rule comprising an identifying description and one or more action types, each action type corresponding to a combination of action attributes, and said classifier rule further storing one or more action attribute values for each action attribute corresponding to the action type, said method comprising steps of:

(a) searching said classifier rule list structure in response to an arrived data packet and identifying one or more matching rules having identifying descriptions that match a key of said arrived data packet;

(b) referring to an attribute definition table having entries that define said one or more action types, each action type representing a combination of action attributes to be applied to a data packet, and determining whether each said one or more action types have been defined for each one or more matching rules, and, (c) for each action type defined, determining a combination of attributes that apply for the corresponding action type from the matching rule or, ending said searching if an action type is not defined; and, (d) applying said corresponding attribute values of each matching rule to said data packet, wherein application of multiple attributes reduce cycle time spent on searching said classifier rule list structure.

10. The method according to claim 9, further including repeating steps (c) through (d) for each of said action types of a classifier rule matched to said key of said data packet.

11. The method according to claim 9, wherein prior to said step a) the steps of:

generating said action attribute definition table having entries for defining one or more action types, said generating including:

selecting one or more action attributes to be associated with each action type; and, entering said selected action attributes for each associated action type in said attribute definition table.

12. The method according to claim 11, wherein each said attribute type definition table entry defines a digital data structure having bit positions corresponding to selectable action attributes, said entering step further including the step of setting a bit position for assigning a corresponding attribute to an action type.

13. A program storage device readable by a machine, tangibly embodying a program of instructions executable by the machine to perform method steps for implementing a packet classifier device including a classifier rule list stake configured for use in a network processor device that processes data packets communicated in a network according to classifier rules, each classifier rule comprising an identifying description and one or more action types, each action type corresponding to a combination of action attributes, and said classifier rule further storing one or more action attribute values for each action attribute corresponding to the action type, said method steps comprising:

(a) searching said classifier rile list structure in response to an arrived data packet and identifying one or more matching rules having identifying descriptions that match a key of said arrived data packet;

(b) referring to an attribute definition table having entries that define said one or more action types, each action type representing a combination of action attributes to be applied to a data packet, and determining whether each said one or more action types have been defined for each one or more matching rules, and, (c) for each action type defined, determining a combination of attributes that apply for the corresponding action type from the matching rule or, ending said searching if an action type is not defined; and, (d) applying said corresponding attribute values of each matching rule to said data packet, wherein application of multiple attributes reduce cycle time spent on searching said classifier rule list structure.

14. The program storage device readable by a machine, tangibly embodying a program of instructions according to claim 13, wherein the method further includes repeating steps (c) through (d) for each of said action types of a classifier rule matched to said key of said data packet.

15. The program storage device readable by a machine as claimed in claim 13, wherein prior to said step a) the steps of:

generating said action attribute definition table having entries for defining one or more action types, said generating including:
  selecting one or more action attributes to be associated with each action type; and,
entering said selected action attributes for each associated action type in said attribute definition table.

16. The program storage device readable by a machine as claimed in claim 15, wherein each said attribute type definition table entry defines a digital data structure having bit positions corresponding to selectable action attributes, said entering step further including the step of setting a bit position for assigning a corresponding attribute to an action type.

* * * * *